Jan. 22, 1963   J. O. YEISER   3,074,523
MAGNETIC FLUID CLUTCH
Filed Jan. 30, 1962

INVENTOR
JOHN O. YEISER

BY  Lawrence Fleming
AGENT 3,074,523
MAGNETIC FLUID CLUTCH
John O. Yeiser, 8402 Tern Circle, Huntington Beach, Calif.
Filed Jan. 30, 1962, Ser. No. 169,844
2 Claims. (Cl. 192—21.5)

This invention relates to magnetic fluid clutches, wherein a mechanical driving member and a driven member are both continuously in contact with a magnetic fluid medium, and wherein the effective viscosity of this fluid medium is controllable by means of the application of a magnetic field, effecting a controllable and variable degree of mechanical coupling between the driving member and the driven member, through the medium of the fluid. The fluid may be a suspension of ferromagnetic particles in a liquid such as oil, or it may be a powder of such particles. Such clutches are known in the art, and may take the form of a hollow cylindrical driving member filled with the magnetic fluid, a disk or drum-shaped driven member coaxial therewith and immersed in the fluid, and an output shaft extending from the driven member to the outside, via a rotating shaft seal.

Such prior art clutches have the disadvantages that the magnetic particles tend to pack into lumps or layers during periods when the clutch is deenergized or released, and also that during such times, or during slip, the rotating shaft seal tends to wear excessively, due to the abrasive properties of known ferromagnetic materials.

However, the magnetic fluid clutch generally has the special advantage that its engagement and disengagement are particularly smooth, and it will operate for long periods stably while continuously slipping, the degree of slip being continuously variable.

An object of this invention is to provide a magnetic fluid clutch in which the magnetic particles are prevented from packing when the clutch is wholly or partially disengaged.

Another object is to provide a magnetic fluid clutch in which the rotating shaft seal is absent and there are no bearing or rubbing surfaces in contact with the magnetic fluid, the motion being transmitted through a flexible member without relative rotation.

Figure 1:
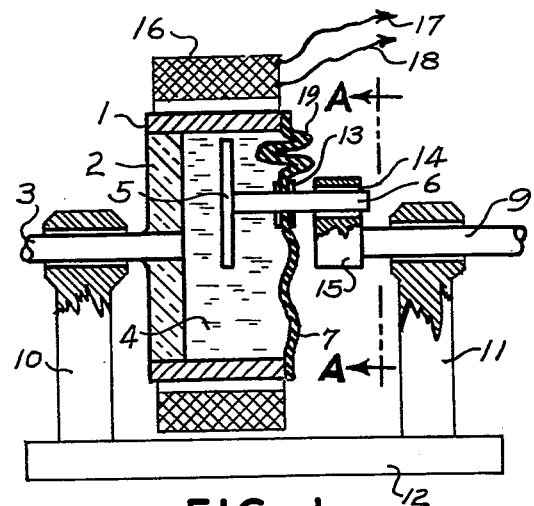
FIG. 1 is a semidiagrammatic sectional view of one form of clutch according to the invention.

Referring to FIG. 1, a magnetic fluid clutch according to this invention may comprise a rotatable cylindrical housing 1, 2 secured to an input shaft 3 and filled with a magnetic fluid 4, and immersed in this fluid a driven member 5. Attached to driven member 5 is a shaft 6, and this shaft extends through and is secured nonrotatably to a flexible closure member 7, at point 13. Driven member shaft 6 extends rotatably into a bearing 14 which is set into a crank member 15. Crank member 15 is fixed nonrotatably to the output shaft 9. Input shaft 3 and output shaft 9 run in bearings or journals set in fixed members 10, 11 of any suitable configuration, set on a base or frame 12.

The flexible closure member 7 is an important feature of the invention. It may be made of sheet rubber or similar material, and have circumferential corrugations as indicated at 19, FIG. 1.

Figure 2:
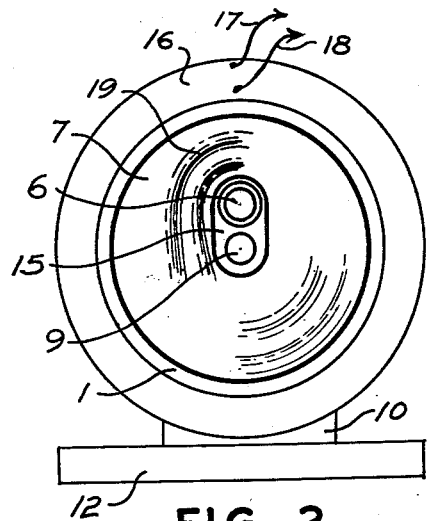
FIG. 2 is a partial end view of FIG. 1 along the line A—A.

FIG. 2 illustrates an end view of the same structure as seen through plane A—A, wherein are apparent the end of housing 1, flexible closure member 7 with a corrugation 19, driven member shaft 6, crank 15, and output shaft 9.

Surrounding the housing 1 is a coil 16 with leads 17, 18 which may be connected to a suitable source of electrical power, not shown, for the purpose of magnetizing the magnetic particles in the fluid 4 (FIG. 1), in order to increase its viscosity and effect, thereby, mechanical coupling between the housing 1, 2 and the driven member 5. The cylindrical shell portion 1 of the housing may be of iron and the end 2 of brass or other non-ferromagnetic material, in order to obtain the most magnetic flux through the fluid 4, according to the known principles of the design of magnetic circuits.

To describe the operation of the embodiment of FIGS. 1 and 2, assume first that the magnet coil is deenergized and hence that the fluid 4 has a relatively low viscosity, and that input shaft 3 is continuously rotating, driven by an external source of power, not shown, and that hence the driven member shaft or output shaft 9 is stationary. Under these conditions crank 15 will be stationary. Driven member 5 and its shaft 6 will be rotating in unison with housing 1, because shaft 6 is fixedly sealed through diaphragm 7 and cannot rotate with respect thereto. Shaft sealing point 13 will execute an orbital motion with respect to the center line of the shafts 3 and 9. Following this orbital motion will be the angular regions of maximum flexure of the diaphragm 7, as at 19; the diaphragm 7 will be continuously flexing in an orbital fashion, but output shaft 9 will be stationary, and driven member shaft 6 will be rotating in the bearing 14, at the same angular velocity as the housing 1.

When the coil 16 is energized so that the viscosity of magnetic fluid 4 is high so as substantially to fix driven member 5 with respect to housing 1, then shaft 6 will act as though an attached part of housing 1, and will bear on the crank 15 and thereby rotate the output shaft 9 as though it were fixed to the input shaft 3. In this state, shaft 6 will not rotate with respect to bearing 14.

Under intermediate conditions of slip, orbital motion of shaft 6 and orbital flexure of diaphragm 7 will obtain with respect to housing 1, but at an angular velocity lower than that of driven shaft 3. At the same time, shaft 6 will rotate relatively slowly with respect to bearing 14 and also rotate output shaft 9 through crank 15, at a lower speed than that of input shaft 3.

The operation may also be viewed from the standpoint of considering shaft 9 as the input shaft. With shaft 9 being rotated and shaft 3 stationary, it is apparent that shaft 6 will execute the orbital motion described above, followed by the area of greatest flexure of the diaphragm 7. And when the coil is fully energized to thicken the magnetic fluid, shaft 6 will be as though fixed to housing 1, and will rotate it via the crank 15.

Under no condition is any bearing or rotating or rubbing joint exposed to the magnetic fluid 4. In addition, when one of the shafts 3, 9 is rotating and the other is not, the orbital motion of the driven member 5 with respect to housing 1 effects a stirring or beating action to keep the magnetic particles of fluid 4 in suspension, instead of settling or packing.

The driven member 5 may be disc-shaped, as in FIG. 1, or it may take other forms, as will be indicated later in connection with FIG. 5.

Figure 3:
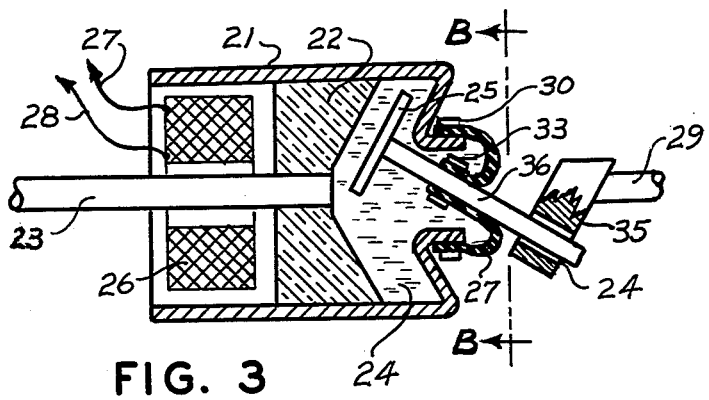
FIG. 3 is a semidiagrammatic sectional view of a modification of the invention.

FIG. 3 shows a modification of the invention in which the driven member shaft executes a nutating or conical motion with respect to the housing. The housing comprises a cylindrical body 21 and a generally disc-shaped member 22, into which is fixed the input shaft 23. The end portion of the body is sealed with a flexible member 27, which may be held in place with the aid of a ring 30. The cavity defined by members 21, 22, 27 is filled substantially with a magnetic fluid 24. Immersed therein is a driven member 25, which is attached to a shaft 36, extending through and sealed nonrotatably to the flexible member 27 at point 33. The outer end of shaft 36 passes rotatably through a bearing 24 in an inclined crank 35. Crank 35 is fixed to an output shaft 29.

Journals for the input and output shafts 23, 29 and base or frame structure analogous to 12, are omitted from the showing of FIG. 3, it being understood that such parts are conventional.

A magnet coil 26 with leads 27, 28 is disposed so as to magnetize the fluid 24 when electrically energized. To facilitate this, shaft 23 and housing 21 may be made of iron or steel, and disc member 22 of non-magnetic material. Coil 26, as well as coil 16, is preferably stationarily mounted, but may if desired be fixed to the housing and rotate with it.

To describe the operation of the modification of FIG. 3, assume that shaft 29 is rotating and shaft 23 is stationary. Since auxiliary or driven-member shaft 36 cannot rotate with respect to housing 21, 22 or attached shaft 23, the auxiliary shaft 36 will describe a conical motion about a vertex located at the intersection of the center lines of shafts 29 and 36; and relative rotation will exist between shaft 36 and bearing 24. The vertex of the cone described by the motion of shaft 36 will be approximately at the point 33 where shaft 36 is sealed through diaphragm of flexible member 27. Thus diaphragm 27 will continuously deform or flex in a conical fashion. The degree of flexure required will be somewhat less than that involved in the orbital motion of FIGS. 1 and 5.

In FIG. 3, when the fluid 24 is heavily magnetized and stiff, the member 25 and its attached shaft 36 will be as though rigidly fixed to housing 21, 22, and the motion of shafts 29 and 23 will be coupled together through the intermediary of crank 24. In this state, as in FIG. 1, there will be no relative rotation between shaft 36 and its bearing 24.

In FIG. 3, it is apparent that if shaft 23 be considered the driving shaft and 36 the driven or output shaft, the clutch will operate in the same manner.

Figure 4:
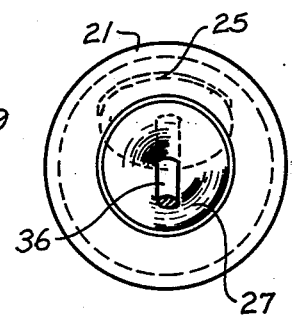
FIG. 4 is a partial end view of FIG. 3 along the line B—B.

FIG. 4 is a partial end view of FIG. 3, to better illustrate the essentials of the construction.

Figure 5:
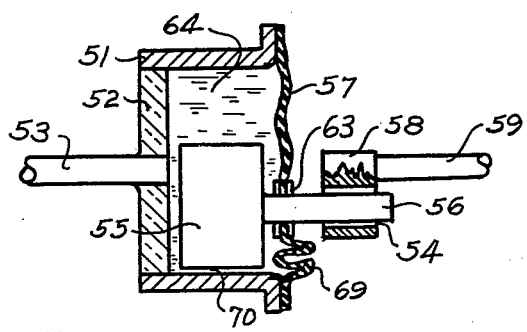
FIG. 5 is a semidiagrammatic sectional view of another modification of the invention.

FIG. 5 is a modification of the invention based on the concept of FIG. 1, and varying therefrom in the shape of the driven member 55. The modification comprises an input shaft 53 fixed to a disc-like portion 52 of a housing 51. One end of housing 51 is closed with a flexible member or diaphragm 57 through which is sealed an auxiliary shaft 56 at point 63. Shaft 56 carries a cylindrical or drum-shaped driven member 55 which is immersed in a magnetic fluid 64, which substantially fills the inside of the housing. The other end of shaft 56 runs in a bearing 54 in a crank member 58 which in turn is fixed to an output shaft 59. A coil or other suitable means, not shown, would be provided for controllably magnetizing the fluid 64.

In FIG. 5, the operation is substantially the same as that of FIG. 1, but there is a different relationship between driven member 55, fluid 64, and housing 51 than with the corresponding elements in FIG. 1. In the latter figure, power is transmitted from the viscous fluid to the driven member 5 primarily through viscous shear between the surfaces of elements 2 and 7 and the plane faces of the disc 5. This construction is advantageous for relatively high-speed, low-torque operation. The form of FIG. 5 combines the transmission of torque through viscous shear between the plane faces of element 55 and the surfaces of elements 52 and 57, together with a wedging action of the viscous fluid between the cylindrical surfaces of members 55 and 51, as for example at point 70. This modification is considered preferable for relatively low speeds and higher torque. There is no relative rotation at any time between auxiliary shaft 56 and flexible diaphragm 57, so that the magnetic fluid 64 has no opportunity to create mechanical wear.

Many variations of the specific configurations of housing, driven member, flexible closure, and other elements are possible within the purview of the invention.

I claim:
1. A magnetic fluid clutc hcomprising:
   a substantially cylindrical housing having a substantially planar interior end surface,
   a driving shaft connected to said housing on its axis,
   a magnetic fluid fill in said housing,
   a substantially disc-shaped driven member located in said housing and having a flat surface spaced relatively closely to and parallel to said planar interior end surface,
   a substantially disc-shaped annularly corrugated flexible member closing the end of said housing opposite said planar interior end surface,
   an intermediate shaft extending through said flexible member, said intermediate shaft being spaced from but parallel to asid axis, and attached perpendicularly to said driven member,
   a driven shaft coaxial with said driving shaft,
   a crank member connected rigidly to said driven shaft and having a bearing spaced from but parallel to said axis,
   said intermediate shaft being journalled in said bearing,
   and means to controllably magnetize said fluid to control its viscosity,
   whereby rotary motion is transmitted predominantly by viscous shear of said fluid in the space between said planar interior end surface and said flat surface of said driven member.
2. A magnetic fluid clutch according to claim 1 wherein said driven member has substantial thickness defining a cylindrical outer surface having a relatively small clearance to the inner surface of said housing, whereby rotary motion is transmitted through a combination of shear and wedging action of said fluid.

References Cited in the file of this patent
UNITED STATES PATENTS

| 2,665,789 | Ingersoll | Jan. 12, 1954 |
| 2,896,456 | Hagopian | July 28, 1959 |

FOREIGN PATENTS

| 249,295 | Switzerland | Apr. 10, 1948 |